(12) United States Patent
Ciervo et al.

(10) Patent No.: US 8,816,816 B2
(45) Date of Patent: Aug. 26, 2014

(54) METHODS AND APPARATUS FOR SECURING A PORTABLE DEVICE

(75) Inventors: Christopher Ciervo, Brookhaven, NY (US); Nadim Ghafoor, Leicester (GB)

(73) Assignee: Symbol Technologies, Inc., Holtsville, NY (US)

( * ) Notice: Subject to any disclaimer, the term of this patent is extended or adjusted under 35 U.S.C. 154(b) by 429 days.

(21) Appl. No.: 12/947,892

(22) Filed: Nov. 17, 2010

(65) Prior Publication Data

US 2012/0119874 A1    May 17, 2012

(51) Int. Cl.
*G05B 19/00* (2006.01)

(52) U.S. Cl.
USPC .......................... 340/5.81; 340/5.8; 340/4.34

(58) Field of Classification Search
CPC .... B60R 25/24; B60R 25/04; B64D 11/0015; G01V 15/00; G06K 7/0008; G06K 7/10128; G07C 9/00111; G06Q 20/382; G06Q 10/087; G06Q 10/063112; G06Q 20/40; G06Q 30/00; G07F 7/08; G06F 21/36
USPC ................................ 340/4.34, 5.8, 5.81, 5.31
See application file for complete search history.

(56) References Cited

U.S. PATENT DOCUMENTS

| 2002/0104887 A1* | 8/2002 | Schlieffers et al. ...... 235/472.02 |
| 2002/0158130 A1* | 10/2002 | Pellaumail et al. ...... 235/462.13 |
| 2009/0140850 A1 | 6/2009 | Kangas et al. |

FOREIGN PATENT DOCUMENTS

| EP | 1031936 | 8/2000 |
| EP | 1927946 | 6/2008 |

OTHER PUBLICATIONS

International Search Report and Written Opinion dated Feb. 6, 2012 in related case PCT/US2011/058075.

* cited by examiner

*Primary Examiner* — Omer S Khan

(57) ABSTRACT

An apparatus for securing a portable device is described. The portable device includes a housing having a mating feature adapted to mate with a corresponding mating feature of the cradle. The cradle includes a locking mechanism that is capable of locking the portable device to the cradle. A transceiver is positioned in the housing. The transceiver is capable of communicating with a remote server containing data of a registered user. A radio-frequency identification (RFID) reader is positioned in the housing. The RFID reader controls the locking mechanism such that the locking mechanism releases the portable device from the cradle when a RFID tag storing the data of the registered user is positioned proximate to the RFID reader.

15 Claims, 4 Drawing Sheets

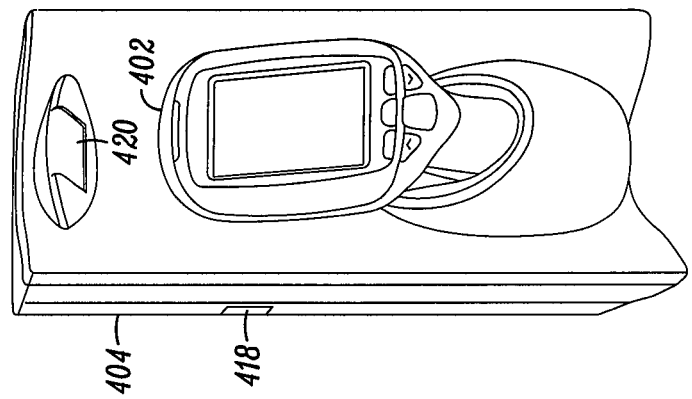
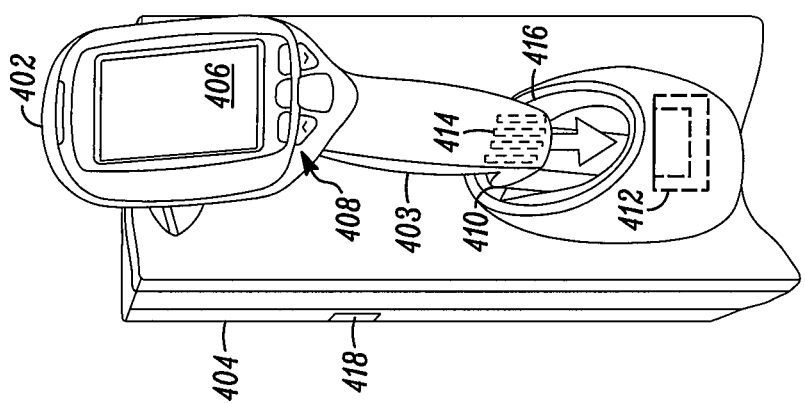

METHODS AND APPARATUS FOR SECURING A PORTABLE DEVICE

TECHNICAL FIELD

This invention relates generally to mechanically securing a portable device to a cradle, and more particularly, to releasing the portable device from the cradle only upon verification that the anticipated user is authorized to use the portable device.

BACKGROUND

The use of portable devices during supermarket shopping is becoming popular. The shopper generally retrieves a device having a bar code scanner near the entrance to the store and uses the device to scan items for purchase. The device scans a bar code on the user's store loyalty card to identify which user is using the device. When the shopping is completed, the user checks out with the device without having to re-scan the items in the shopping cart.

SUMMARY

In one aspect, the invention is embodied in a portable device. The portable device includes a housing having a mating feature adapted to mate with a corresponding mating feature of the cradle. The cradle includes a locking mechanism that is capable of locking the portable device to the cradle. A transceiver is positioned in the housing. The transceiver is capable of communicating with a remote server containing data of a registered user. A radio-frequency identification (RFID) reader is positioned in the housing. The portable device controls the locking mechanism such that the locking mechanism releases the portable device from the cradle when a RFID tag storing the data of the registered user is positioned proximate to the RFID reader. Once the user is validated by the server database, the server wirelessly sends the portable device the command to unlock the cradle.

In one embodiment, a database stores the data of the registered user. The data stored on the RFID tag can be compared to the registered user data stored in the database prior to the locking mechanism releasing the portable device. The RFID tag can include location information.

The RFID reader can read a RFID tag located in the cradle to register a location of the portable device relative to the cradle. The locking mechanism can release the portable device when the data of the registered user data is validated and a battery level of the portable device is tested. The cradle can include a charging circuit for charging a battery of the portable device.

The locking mechanism can include a solenoid. The RFID tag can be embedded in a customer loyalty card. The cradle can also include an indicator for indicating at least one of a battery charge of the portable device and a status of the locking mechanism. The portable device can embody a mobile data capture device and an indicator of battery charge.

In another aspect, the invention is embodied in a system including a portable device having a radio-frequency identification (RFID) reader for controlling a locking mechanism. The portable device also includes a transceiver capable of communicating with a remote server containing data of a registered user. A cradle is adapted to mate with the portable device such that a locking mechanism of the cradle is capable of locking the portable device to the cradle. An RFID tag stores the data of the registered user. The locking mechanism of the cradle releases the portable device when the RFID tag is positioned proximate to the portable device.

In one embodiment, the system also includes a database for storing the data of the registered user. The data stored on the RFID tag is compared to the registered user data stored in the database prior to the locking mechanism releasing the portable device.

In one embodiment, the database stores product information. The cradle can also include a charging circuit for charging a battery of the portable device. The RFID tag can be embedded in a customer loyalty card. The portable device can embody a mobile data capture device. The cradle can also include a networking component that is adapted to couple the cradle to a network. The locking mechanism can include a solenoid.

In another aspect, the invention is embodied in a method for removing a portable device from a cradle. The method includes positioning a radio-frequency identification (RFID) tag storing data of a registered user proximate to a portable device locked in a locking mechanism of a cradle. An RFID reader of the portable device is capable of reading the data stored in the RFID tag and controlling the locking mechanism. The portable device is unlocked from the cradle in response to a comparison of the data stored on the RFID tag and registered user data stored in a database. The portable device is removed from the cradle. The method can also include storing the database in a remote server.

BRIEF DESCRIPTION OF THE FIGURES

Skilled artisans will appreciate that elements in the figures are illustrated for simplicity and clarity and have not necessarily been drawn to scale. For example, the dimensions of some of the elements in the figures may be exaggerated relative to other elements to help improve understanding of various embodiments. In addition, the description and drawings do not necessarily require the order illustrated. It will be further appreciated that certain actions and/or steps may be described or depicted in a particular order of occurrence while those skilled in the art will understand that such specificity with respect to sequence is not actually required. Apparatus and method components have been represented where appropriate by conventional symbols in the drawings, showing only those specific details that are pertinent to understanding the various embodiments so as not to obscure the disclosure with details that will be readily apparent to those of ordinary skill in the art having the benefit of the description herein. Thus, it will be appreciated that for simplicity and clarity of illustration, common and well-understood elements that are useful or necessary in a commercially feasible embodiment may not be depicted in order to facilitate a less obstructed view of these various embodiments.

The above and further advantages of this invention may be better understood by referring to the following description in conjunction with the accompanying drawings, in which like numerals indicate like structural elements and features in various figures. Skilled artisans will appreciate that reference designators shown herein in parenthesis indicate components shown in a figure other than the one in discussion. For example, talking about a device (10) while discussing Figure A would refer to an element, 10, shown in figure other than Figure A.

FIGS. 4A and 4B are perspective views of a portable device and a cradle according to one embodiment of the invention.

DETAILED DESCRIPTION

The following detailed description is merely illustrative in nature and is not intended to limit the invention or the application and uses of the invention. Furthermore, there is no intention to be bound by any express or implied theory presented in the preceding technical field, background, brief summary or the following detailed description. For the purposes of conciseness, many conventional techniques and principles related to conventional image-based capture, need not, and are not, described in detail herein.

Techniques and technologies may be described herein in terms of functional and/or logical block components and various processing steps. It should be appreciated that such block components may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

The following description may refer to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. The term "exemplary" is used in the sense of "example, instance, or illustration" rather than "model," or "deserving imitation."

Technologies and concepts discussed herein relate to portable devices for use in retail establishments. In an exemplary embodiment, a portable device is secured in a cradle. A user with a customer loyalty card having a radio-frequency identification (RFID) tag uses the card to release the portable device from the cradle.

Figure 1:
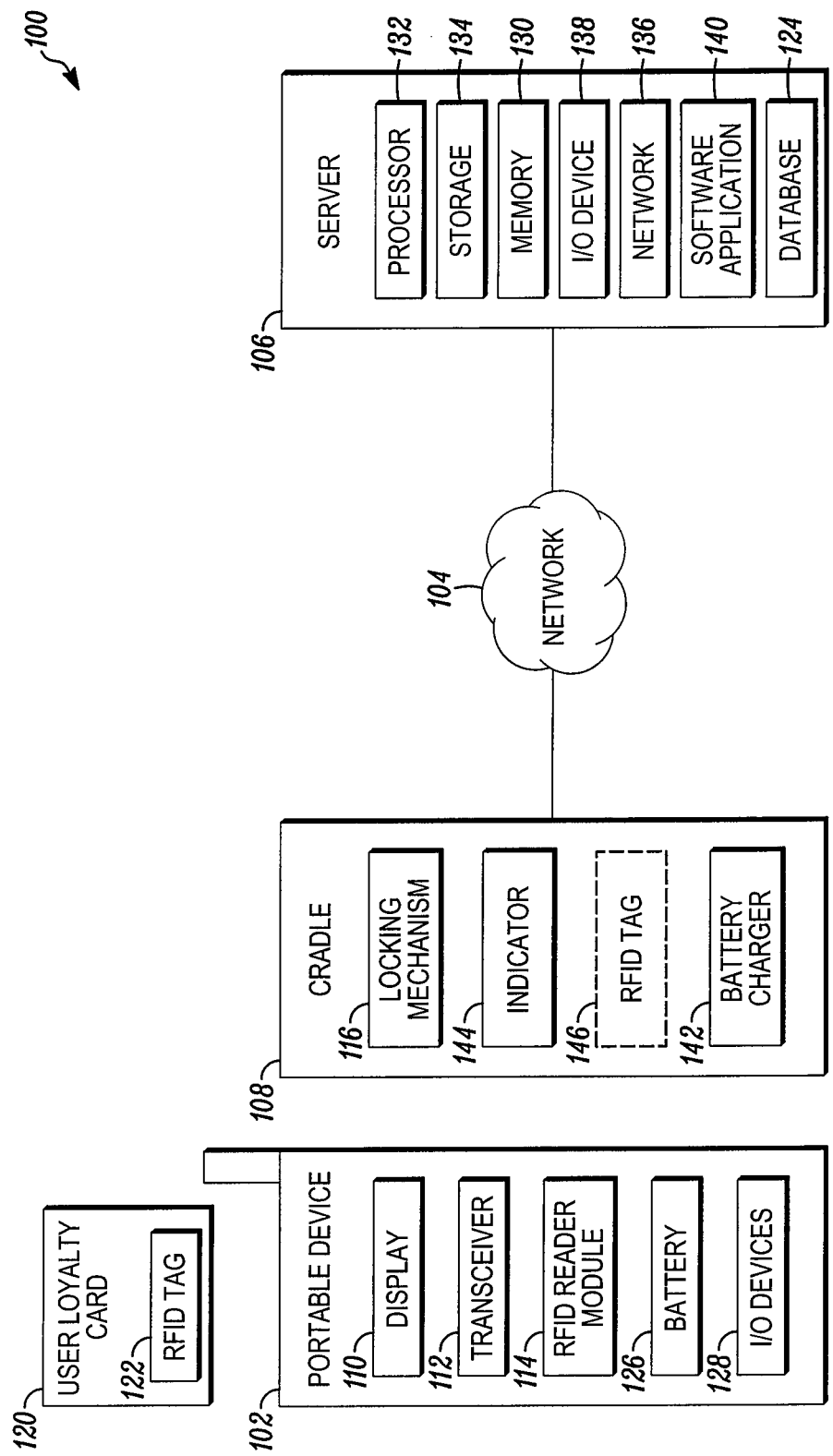
FIG. 1 illustrates a block diagram of one embodiment of a system according to the invention.

FIG. 1 illustrates a block diagram of one embodiment of a system 100 according to the invention. The system 100 includes a portable device 102, a network 104, a server 106, and a cradle 108. A potential user of the portable device 102 must unlock the portable device 102 from the cradle 108 prior to using the portable device 102.

The portable device 102 includes a display 110 for displaying information relating to user identification, account information, location information, product information, service information, advertisements, coupons, marketing, or any other information relevant to the shopping experience in the store. A transceiver 112 connects the portable device 102 to the network 104 by providing communication functionality for the portable device 102. The portable device 102 can also include a radio-frequency identification (RFID) reader module 114 for reading RFID tags located within range of the RFID reader module 114. For example, an RFID tag containing product information can be secured to a product or located within the packaging of the product. The product information can include price, quantity, nutritional information, weight, date of manufacture, or any other desired information. As will be discussed herein, the RFID reader module 114 can also trigger a locking mechanism 116 on the cradle 108 to unlock the portable device 102 from the cradle 108.

In one embodiment, a customer loyalty card 120 including a radio-frequency (RFID) tag 122 can be positioned within range of the RFID reader module 114. The RFID tag 122 can include customer data, such as registration information. The RFID reader module 114 can read the customer data from the RFID tag 122. The data can be transmitted by the portable device 102 through the network 104 to the server 106. The server 106 can access a database including user registration information to verify that the customer is registered in the database 124. The server 106 sends a signal to the portable device 102 indicating whether or not the user is authorized to use the portable device 102. The customer loyalty card 120 could be any object containing an RFID tag, such as a credit card, membership card, club card, speed pass token, or any other suitable object.

The portable device 102 can also include a battery 126. The battery 126 provides power to the electronic components of the portable device 102. The battery 126 can be a rechargeable battery, such as a lithium ion, nickel metal hydride, or nickel cadmium, for example.

The portable device 102 also includes one or more input/output (I/O) devices 128 such as a keyboard with alphanumeric keys. Other I/O elements can include soft and/or hard keys, a touch screen, a joystick, a trackball, a thumbwheel, an optical mouse, a touch pad, a jog wheel, an optical control, and/or a pointing device, a microphone, and a speaker, for example. In some embodiments, the portable device 102 includes more or less than all of the aforementioned I/O elements. Components of the portable device 102 will be discussed in more detail herein with reference to FIG. 2.

The server 106 can be a stand-alone computer coupled to the network 104 and the cradle 108. Alternatively, the server 106 can be integrated with the cradle 108. The server 106 can be a personal computer (desktop or laptop), a handheld computer, a Personal Digital Assistant (PDA), or a cellular phone, for example. The server 106 can include a memory 130, a processor 132, a storage device 134, a network connection module 136, and input/output devices 138 such as a display, a mouse, a printer, and/or a keyboard.

The server 106 also includes a software application 140 that receives requests from the portable device 102. The requests can relate to verifying an identity and/or registration of a user. The software application 140 can communicate with the database 124 that contains user data. The database 124 can reside on the server 106 or alternatively, can be remotely located from the server 106. The software application 140 can also provide functionality relating to retrieving product information. In practice, the software application 140 can provide any desired functionality. Various techniques for accessing information stored in the database 124 can be used without departing from the invention.

The server 106 can also include server software that can track the charge level of the battery 126. In one embodiment, the server software can transmit commands to a portable device 102 located in a cradle 108 to change the portable device's status in response to the charge level of the battery 126. The status change can be indicated on the portable device 102 and/or on the cradle 108. For example, if the charge level of the battery 126 is above an acceptable user-defined threshold, the server software can command the portable device 102 to change the status indicator from "not ready" to "ready" indicating that the portable device 102 is ready for use. Alternatively, if the charge level of the battery 126 is below an acceptable user-defined threshold, the server software can command the portable device 102 to change the status indicator from "ready" to "not ready" indicating that the portable device 102 is not ready for use and/or that the battery 126 is charging.

The network connection module 136 can include hardware and software required to connect the server 106 to the network 104. The network 104 can be any network, such as a Wide Area Network (WAN) or a Local Area Network (LAN), or any other network including a cellular network. The WAN may include the Internet, for example. A LAN may include an Intranet, for example.

The cradle 108 is adapted to receive the portable device 102. For example the cradle 108 can include a mating feature that mates with a corresponding mating feature on the portable device 102. The cradle 108 includes an electrical connector that mates with an electrical connector on the portable device 102. The electrical connectors can facilitate the transmission of signals between the cradle 108 and the portable device 102. Alternatively, the cradle 108 and the portable device 102 can communicate wirelessly through a wireless network, such as a Bluetooth or a ZigBee network, for example.

The cradle 108 also includes the locking mechanism 116 that can secure the portable device 102 to the cradle 108. In one embodiment, the locking mechanism 116 includes a solenoid having an actuator that engages with a mechanical feature on the portable device 102 to lock the portable device 102 to the cradle 108. Alternatively, the actuator of the solenoid can be coupled to a mechanical feature of the cradle 108 that engages a mechanical feature of the portable device 102. The actuator can be a linear actuator or a rotary actuator.

In one embodiment, the mechanical feature of the cradle 108 can be a spring loaded latch such that when the portable device 102 is placed in the cradle 108, an audible click is heard indicating that the portable device 102 is locked in the cradle 108. Skilled artisans will appreciate that various techniques can be used to secure the portable device 102 to the cradle 108 without departing from the invention. For example, in addition to mechanical securing techniques, the portable device 102 can be secured to the cradle 108 using an electro-magnetic mechanism. In practice, any suitable locking mechanism can be used.

The cradle 108 can also include a battery charging circuit 142. The battery charging circuit 142 can include an electrical connector that mates with an electrical connector accessible on the portable device 102. The battery 126 in the portable device 102 is charged when the portable device 102 is placed in the cradle 108. In one embodiment, the battery charging circuit 142 can include a wireless charging coil. The portable device 102 can include a complementary coil. The wireless charging coil can wirelessly charge the portable device 102 when the portable device 102 is placed in the cradle 108.

The cradle 108 can also include an indicator 144. The indicator 144 can include one or more light emitting diodes (LED's). The LED's can indicate a status of the portable device 102. For example, a green LED can indicate that the portable device 102 is ready for use. An orange LED can indicate that the battery 126 in the portable device 102 is charging. A red LED can indicate that the portable device 102 is not ready for use. In another embodiment, the indicator 144 is a display, such as an LCD display or an e-ink display. In practice, the indicator 144 can be a lamp, a LED, a display, a speaker, or any other suitable indicator.

The indicator 144 can also display information relating to a user. For example, the indicator 144 can indicate that a user is authorized to use a specific portable device 102. In one embodiment, the indicator 144 can indicate that the user should report to the customer service counter.

The cradle 108 can optionally include a RFID tag 146. The RFID tag 146 can include data relating to a location of the cradle 108, for example. The RFID tag 146 can be read by the RFID reader module 114 of the portable device 102. The portable device 102 can transmit the data from the RFID tag 146 to the server 106.

The portable device 102 can be a mobile computer, a personal digital assistant (PDA), a cellular telephone or a satellite telephone, for example. The portable device 102 includes electronic components, including internal communication components and circuitry as further described with relation to FIG. 2 to enable the portable device 102 to function and to communicate wirelessly with other devices including a host device.

Figure 2:
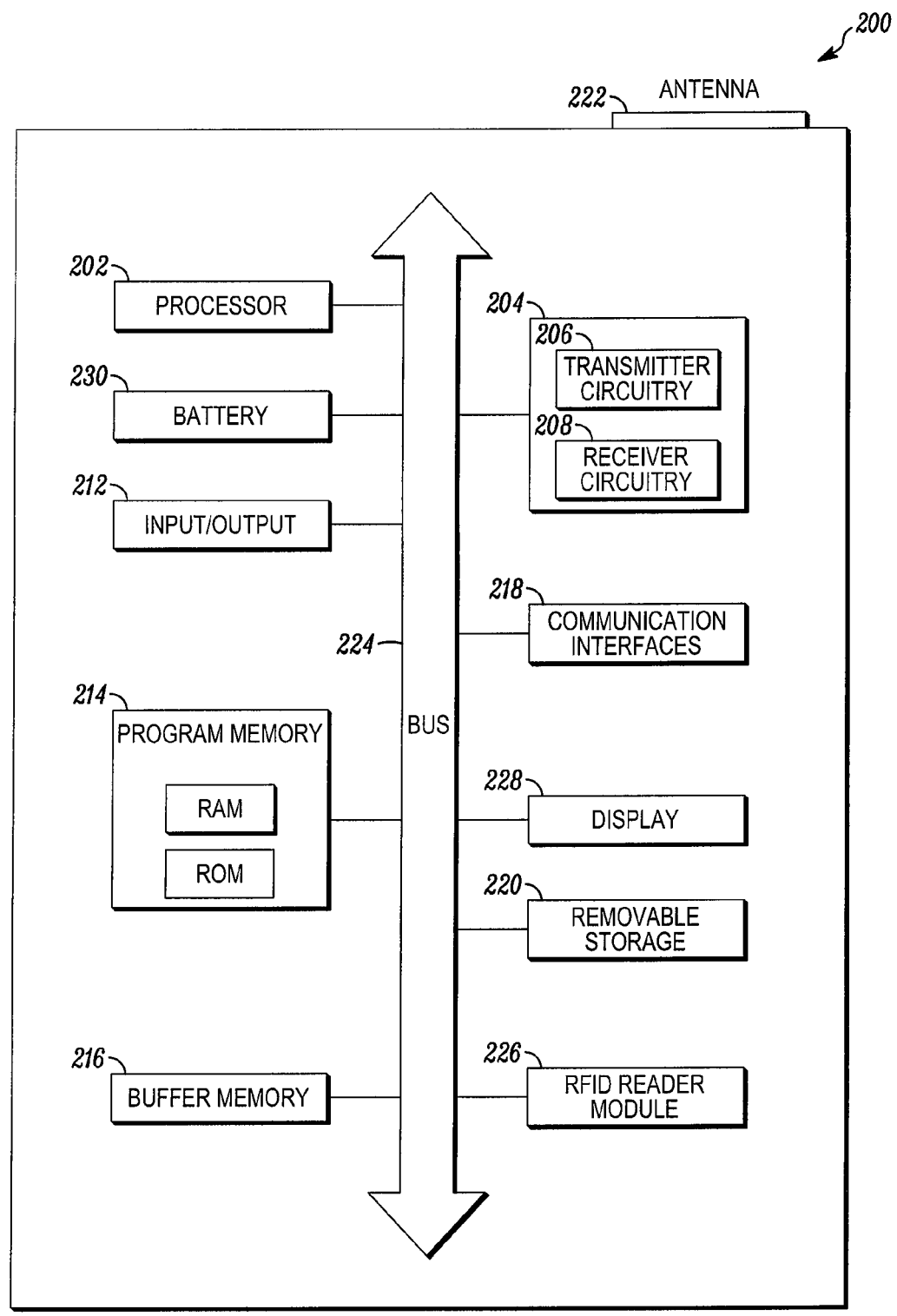
FIG. 2 is a block diagram illustrating the electronic components of the portable device of FIG. 1 according to the invention.

FIG. 2 is a block diagram 200 illustrating the electronic components of the portable device 102 (FIG. 1) according to the invention. The portable device 102 contains, among other components, a processor 202, a transceiver 204 including transmitter circuitry 206 and receiver circuitry 208, an antenna 222, the I/O devices 212 described in relation to FIG. 1, a program memory 214 for storing operating instructions that are executed by the processor 202, a buffer memory 216, one or more communication interfaces 218, an integrated display 228, a battery 230, an optional removable storage 220, and a radio-frequency identification (RFID) reader module 226 coupled to the portable device 102.

The RFID reader module 226 is integrated with the portable device 102 (FIG. 1) for reading an RFID tag located within range of the RFID reader module 226 of the portable device 102, for example. In some embodiments, a motion tracking module (not shown), such as an accelerometer or global positioning system (GPS) can be used to track a location and/or an orientation of the portable device 102.

In one embodiment, the portable device 102 is an integrated unit containing the components depicted in FIG. 2, as well as any other component necessary for the portable device 102 to function. In one embodiment, the electronic components are connected by a bus 224.

The processor 202 can include one or more microprocessors, microcontrollers, DSPs, state machines, logic circuitry, or any other device or devices that process information based on operational or programming instructions. Such operational or programming instructions are preferably stored in the program memory 214. The program memory 214 can be an IC memory chip containing any form of random access memory (RAM) or read only memory (ROM), a floppy disk, a compact disk (CD) ROM, a hard disk drive, a digital video disk (DVD), a flash memory card or any other medium for storing digital information. Skilled artisans will recognize that when the processor 202 has one or more of its functions performed by a state machine or logic circuitry, the program memory 214 containing the corresponding operational instructions may be embedded within the state machine or logic circuitry. Operations performed by the processor 202 as well as the portable device 102 are described in detail below.

The transmitter circuitry 206 and the receiver circuitry 208 enable the portable device 102 to respectively transmit and receive communication signals. In this regard, the transmitter circuitry 206 and the receiver circuitry 208 include circuitry to enable wireless transmissions. The implementations of the transmitter circuitry 206 and the receiver circuitry 208 depend on the implementation of the portable device 102 and the devices with which it is to communicate. For example, the transmitter and receiver circuitry 206, 208 can be implemented as part of the communication device hardware and software architecture in accordance with known techniques. One of ordinary skill in the art will recognize that most, if not all, of the functions of the transmitter or receiver circuitry 206, 208 can be implemented in a processor, such as the processor 202. However, the processor 202, the transmitter circuitry 206, and the receiver circuitry 208 have been partitioned herein to facilitate a better understanding of the functions of these elements. The antenna 222 can be a WAN or a LAN antenna or a cellular network antenna coupled to the transceiver 204.

The buffer memory 216 may be any form of volatile memory, such as RAM, and is used for temporarily storing information received from the remote server 106, (FIG. 1) for example. The removable storage 220 can be a secure digital (SD) memory card, for example.

The display 228 displays data generated by software applications residing in the memory 214 and executing on the processor 202 as well as customer information and/or product information received from the remote server 106. The display 228 can be a liquid crystal display (LCD) or any other suitable display. In one embodiment, the display 228 is a touch screen display having user input capabilities. For example, the user can touch the surface of the display 228 to activate a function of the device 102.

Figure 3:
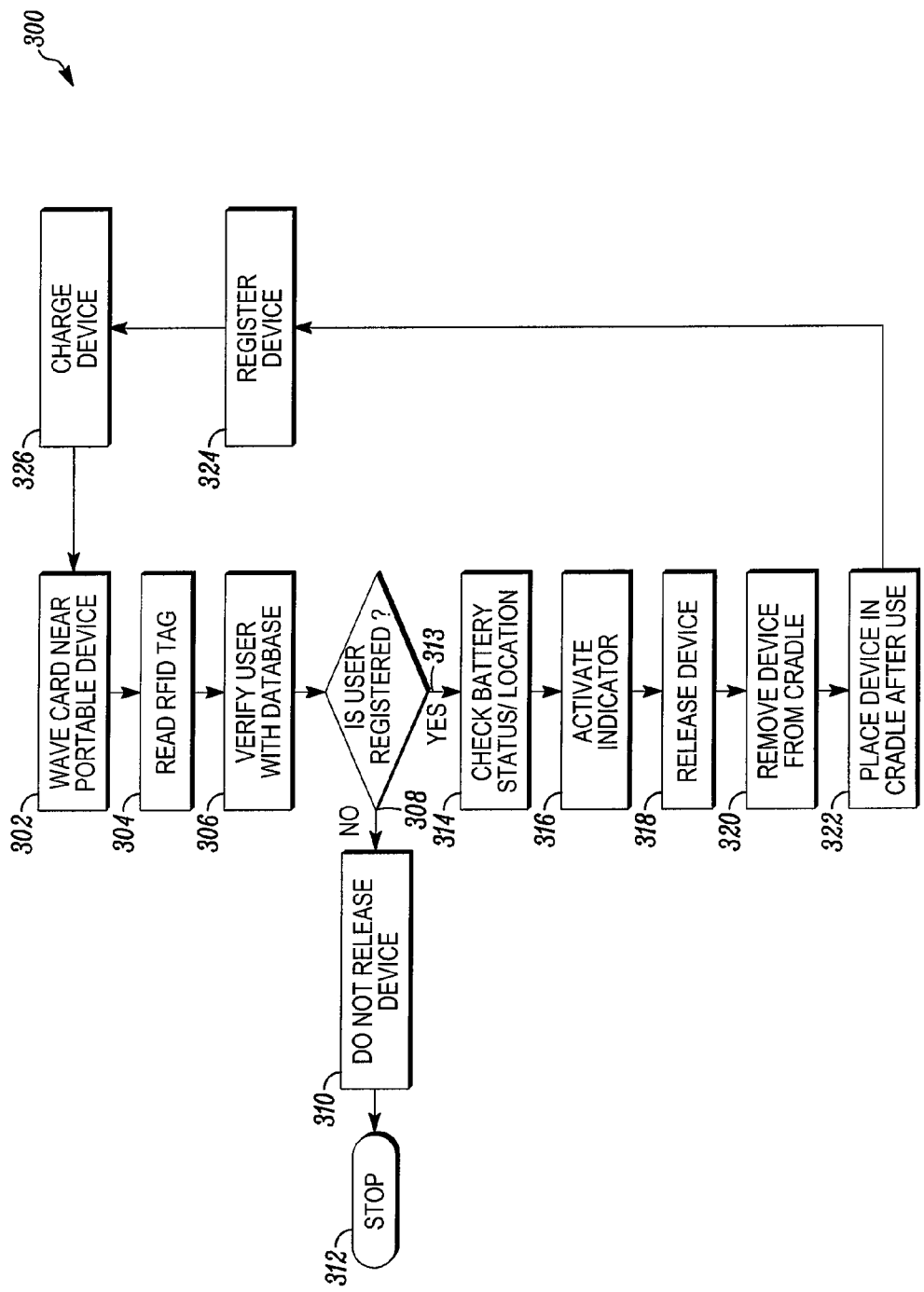
FIG. 3 is a flowchart illustrating one mode of operation of a system in accordance with the invention.

FIG. 3 is a flowchart 300 illustrating one mode of operation of a system in accordance with the invention. In a first step 302, a user approaches the portable device 102 and waves a customer loyalty card 120 (FIG. 1) proximate to the portable device 102. In step 304, the RFID reader module 114 in the portable device 102 reads the RFID tag 122 in the loyalty card 120 to extract user data from the RFID tag 122. A software application executing on the processor 202 (FIG. 2) instructs the transceiver 204 to transmit the user data to the server 106. The server 106 accesses a database 124 containing data for all the registered users in the system. The server 106 verifies that the user requesting to use the portable device 102 is registered in the database 124 (step 306). In some embodiments, the server 106 can also provide other functionality such as whether the user is entitled to coupons, rebates, or other special programs.

If the server 106 determines that the user is not registered in the database (step 308), the server 106 can transmit a "do not release" signal to the portable device 102 (step 310). The portable device 102 can send a signal to the indicator 144 on the cradle 108 indicating that the user is not authorized to use the portable device 102. The indicator 144 can be a red LED, for example. In another embodiment, the indicator is a display that indicates that the user should proceed to customer service. The process ends (step 312) and the portable device 102 remains locked in the cradle 108.

If the server 106 determines that the user is registered in the database (step 308), the server 106 can transmit a "release" signal to the portable device 102 (step 313). A software application executing on a processor in the portable device 102 checks the battery status of the portable device 102 to determine if the battery capacity is adequate (step 314). If the battery capacity is adequate, the software application can activate an indicator 144 on the corresponding cradle 108 that houses the portable device 102 (step 316). The indicator 144 indicates the location of the portable device 102 and the status of the portable device 102. For example, the indicator 144 can be a green LED indicating that the portable device 102 is ready for use.

In one embodiment, multiple cradles 108 each securing a portable device 102 can be located together. In this embodiment, the indicator 144 on the cradle 108 with the portable device 102 having the highest battery capacity compared with the other portable devices 102 can be activated indicating that the portable device 102 is ready for use. In other embodiments, two or more indicators 144 can be activated, thereby giving a user a choice of several portable devices 102 that are ready to use.

The portable device 102 also sends a signal to the cradle 108 to unlock the portable device 102 (step 318). For example, the processor in the portable device 102 can command the locking mechanism 116 of the cradle 108 to release the portable device 102. In one embodiment, several portable devices may simultaneously be ready for use and in an unlock state in their corresponding cradles. In this embodiment, once a user removes a particular portable device from a cradle 108, the locking mechanisms of the other cradles will immediately secure the other portable devices.

In step 320, the user removes the portable device 102 from the cradle 108. In step 322, the user can return the portable device 102 to an empty cradle 108, or alternatively, a store employee can return the portable device 102 to an empty cradle 108. It should be noted that the portable device 102 can be returned to any empty cradle 108 and not necessarily to its original cradle 108.

Once the portable device 102 is returned to the cradle 108, the portable device 102 can register itself with the server 106 (step 324). For example, the portable device 102 can upload information to the server, such as last shopping event data, the current location of the portable device 102 (e.g., current cradle information), battery status, or any other desired information. In the event that the battery requires charging, the portable device 102 can command the charging circuit in the cradle 108 to begin charging the battery in the portable device 102 (step 326). Alternatively, the battery charging circuit can be activated by default when the portable device 102 is positioned in the cradle 108.

FIGS. 4A and 4B are perspective views 400 of a portable device 402 and a cradle 404 according to one embodiment of the invention. Referring to FIG. 4A, the portable device 402 includes a housing 403, and display 406 and a plurality of input keys 408. The portable device 402 can also include a mechanical feature 410 that mates with a corresponding mechanical feature 412 of the cradle 404 to secure the portable device 402 in the cradle 404. The portable device 402 can also include electrical contacts 414 that mate with electrical contacts (not shown) on the cradle 404.

The cradle 404 includes a slot 416 for receiving the portable device 402. In one embodiment, the slot 416 is a mating feature shaped to conform to a mating feature (a portion of the housing 403) portable device 402. The cradle 404 also includes a port 418, such as a universal serial (USB) port for connecting the cradle 404 to other cradles or a host device. In one embodiment, the cradle 404 is also coupled to a network, either wirelessly or through a wired connection to the port 418.

The cradle 404 can also include an indicator 420. The indicator 420 can be a lamp, a LED, a display, a speaker, or any other suitable indicator. The indicator 420 can indicate a status of the portable device 402, for example.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and apparatus for securing the portable device described herein. The non-processor circuits may include, but are not limited to, a radio receiver, a radio transmitter, signal drivers, clock circuits, power source circuits, and user input devices. As such, these functions may be interpreted as steps of a method to secure the portable device described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Both the state machine and ASIC are considered herein as a "processing device" for purposes of the foregoing discussion and claim language.

Moreover, an embodiment can be implemented as a computer-readable storage element or medium having computer readable code stored thereon for programming a computer (e.g., comprising a processing device) to perform a method as described and claimed herein. Examples of such computer-readable storage elements include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

While at least one example embodiment has been presented in the foregoing detailed description, it should be appreciated that a vast number of variations exist. It should also be appreciated that the example embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

In addition, the section headings included herein are intended to facilitate a review but are not intended to limit the scope of the present invention. Accordingly, the specification and drawings are to be regarded in an illustrative manner and are not intended to limit the scope of the appended claims.

In interpreting the appended claims, it should be understood that:

a) the word "comprising" does not exclude the presence of other elements or acts than those listed in a given claim;

b) the word "a" or "an" preceding an element does not exclude the presence of a plurality of such elements;

c) any reference signs in the claims do not limit their scope;

d) several "means" may be represented by the same item or hardware or software implemented structure or function;

e) any of the disclosed elements may be comprised of hardware portions (e.g., including discrete and integrated electronic circuitry), software portions (e.g., computer programming), and any combination thereof;

f) hardware portions may be comprised of one or both of analog and digital portions;

g) any of the disclosed devices or portions thereof may be combined together or separated into further portions unless specifically stated otherwise; and h) no specific sequence of acts or steps is intended to be required unless specifically indicated.

What is claimed is:

1. A portable device, comprising:
   a housing having a mating feature adapted to mate with a corresponding mating feature of a cradle, the cradle including a locking mechanism capable of locking the portable device to the cradle;
   a transceiver positioned in the housing, the transceiver capable of communicating with a remote server including a database for storing data of one or more registered users;
   a radio-frequency identification (RFID) reader positioned in the housing, the RFID reader reading a first RFID tag storing the data of a registered user that is positioned proximate to the RFID reader; and a processor coupled to the RFID reader for controlling the locking mechanism such that the locking mechanism releases the portable device from the cradle and puts the portable device in an unlocked state when the data of the registered user stored in the first RFID tag is validated when compared to the data stored in the database and a battery level of a battery of the portable device is highest among a corresponding battery level of each of a plurality of portable devices capable of communicating with the remote server, wherein the locking mechanism is communicatively coupled to locking mechanisms of a plurality of portable devices in the unlocked state and the locking mechanism relocks the portable device to the cradle when a second portable device from the plurality of portable devices in the unlocked state is removed from a cradle associated with the second portable device.

2. The portable device of claim 1, wherein the first RFID tag further comprises location information.

3. The portable device of claim 1, wherein the RFID reader further reads a second RFID tag located in the cradle to register a location of the portable device relative to the cradle.

4. The portable device of claim 1, further comprising a charging circuit for charging the battery of the portable device.

5. The portable device of claim 1, wherein the first RFID tag further comprises a customer loyalty card.

6. The portable device of claim 1, wherein the portable device further comprises a mobile data capture device.

7. A system comprising:
a portable device having a radio-frequency identification (RFID) reader for reading a first RFID tag storing data of a registered user that is positioned proximate to the RFID reader and a transceiver capable of communicating with a remote server including a database for storing data of one or more registered users;
a cradle adapted to mate with the portable device such that a locking mechanism of the cradle is capable of locking the portable device to the cradle; and
a processor coupled to the RFID reader for controlling the locking mechanism of the cradle such that the locking mechanism releases the portable device and puts the portable device in an unlocked state when data of the registered user stored in the first RFID tag is validated when compared to the data stored in the database and a battery level of a battery of the portable device is highest among a corresponding battery level of each of a plurality of portable devices capable of communicating with the remote server, wherein the locking mechanism is communicatively coupled to locking mechanisms of a plurality of portable devices in the unlocked state and the locking mechanism relocks the portable device to the cradle when a second portable device from the plurality of portable devices in the unlocked state is removed from a cradle associated with the second portable device.

8. The system of claim 7, wherein the cradle further comprises an indicator for indicating at least one of a battery charge of the portable device and a status of the locking mechanism.

9. The system of claim 7, wherein the database is further for storing product information.

10. The system of claim 7, wherein the cradle further comprises a charging circuit for charging the battery of the portable device.

11. The system of claim 7, wherein the first RFID tag further comprises a customer loyalty card.

12. The system of claim 7, wherein the portable device further comprises a mobile data capture device.

13. The system of claim 7, wherein the cradle further comprises a networking component adapted to couple the cradle to a network.

14. The system of claim 7, wherein the locking mechanism further comprises a solenoid.

15. A method comprising:
positioning a radio-frequency identification (RFID) tag storing data of a registered user proximate to a portable device locked in a locking mechanism of a cradle, an RFID reader of the portable device capable of reading the data stored in the RFID tag;
unlocking the portable device from the cradle and putting the portable device in an unlocked state when the data of the registered user stored in the RFID tag is validated when compared to data of one or more registered users stored in a database of a remote server, and a battery level of a battery of the portable device is highest among a corresponding battery level of each of a plurality of portable devices capable of communicating with the remote server, wherein a locking mechanism of the portable device is communicatively coupled to locking mechanisms of a plurality of portable devices in the unlocked state and the locking mechanism relocks the portable device to the cradle when a second portable device from the plurality of portable devices in the unlocked state is removed from a cradle associated with the second portable device; and
removing the portable device from the cradle.

* * * * *